US012431282B2

(12) United States Patent
Suzuki et al.

(10) Patent No.: US 12,431,282 B2
(45) Date of Patent: Sep. 30, 2025

(54) TERMINAL BLOCK, BOBBIN, AND COIL DEVICE

(71) Applicant: TAMURA CORPORATION, Tokyo (JP)

(72) Inventors: Kotaro Suzuki, Tokyo (JP); Kazuki Sakamoto, Tokyo (JP)

(73) Assignee: TAMURA CORPORATION, Tokyo (JP)

( * ) Notice: Subject to any disclaimer, the term of this patent is extended or adjusted under 35 U.S.C. 154(b) by 1073 days.

(21) Appl. No.: 17/410,434

(22) Filed: Aug. 24, 2021

(65) Prior Publication Data

US 2022/0093323 A1 Mar. 24, 2022

(30) Foreign Application Priority Data

Sep. 18, 2020 (JP) ................................ 2020-157973

(51) Int. Cl.
*H01F 27/29* (2006.01)
*H01F 27/32* (2006.01)

(52) U.S. Cl.
CPC ........... *H01F 27/29* (2013.01); *H01F 27/325* (2013.01)

(58) Field of Classification Search
CPC .......... H01R 13/40; H01R 13/02; H01R 9/24; H01R 13/424; H01R 13/426; H01R 13/428
See application file for complete search history.

(56) References Cited

U.S. PATENT DOCUMENTS 2,963,678 A * 12/1960 Wolf ......................... H01F 5/04 338/322
3,663,914 A * 5/1972 Lane ......................... H01F 5/04 439/874
4,590,398 A * 5/1986 Nagamatsu ............ H01R 39/40 310/239
4,720,646 A * 1/1988 Torimoto ............... H02K 3/525 310/194
5,001,379 A * 3/1991 Katayama .............. H02K 5/225 310/194
8,415,851 B2 * 4/2013 Huang ................... H01R 13/41 310/194

FOREIGN PATENT DOCUMENTS

JP S56-19220 Y2 5/1981
JP S59-8303 A 1/1984
JP S62-149827 U 9/1987
JP 2740711 B2 4/1998

* cited by examiner

*Primary Examiner* — Edwin A. Leon
(74) *Attorney, Agent, or Firm* — Oliff PLC

(57) ABSTRACT

A terminal block includes a terminal and a base having a terminal attachment part to which the terminal is attached. The terminal includes a coupling part coupled to the terminal attachment part. The terminal attachment part is formed with an insertion hole extending in a first direction and into which the coupling part is inserted, and a fitting hole communicating with the insertion hole. The coupling part includes a click part configured to fit into the fitting hole, and the click part projects toward the fitting hole by being bent at a root of the click part along a straight line substantially parallel to the first direction.

14 Claims, 5 Drawing Sheets

TERMINAL BLOCK, BOBBIN, AND COIL DEVICE

CROSS-REFERENCE TO RELATED APPLICATION

This application claims priority under 35 U.S.C. § 119 from Japanese Patent Application No. 2020-157973 filed on Sep. 18, 2020. The entire subject matter of the application is incorporated herein by reference.

BACKGROUND

Technical Field

Aspects of the present disclosure relate to a terminal block, a bobbin, and a coil device.

Related Art

A coil device is known in which a terminal block is provided on a bobbin. A terminal insertion port for inserting and fixing a terminal and a fitting hole connected to the terminal insertion port are formed to the terminal mounting part of the terminal block. The terminal has a click formed by cutting and raising. When the terminal is inserted into the terminal insertion port, the click of the terminal fits into the fitting hole of the terminal attachment part so that the terminal is attached to the terminal attachment part by so-called snap-fit.

SUMMARY

In the above-described terminal block, the click raised toward the fitting hole is formed by bending the root of the click of the terminal along a straight line (hereinafter referred to as a "lateral axis") perpendicular to a terminal insertion direction. Therefore, the click of the terminal has low rigidity against torque around the lateral axis, and thus the click easily swings about the lateral axis. When the terminal is inserted into the terminal insertion port, the torque around the lateral axis acts on the click. Therefore, the click temporarily bends down by elastic deformation, and when the click reaches the fitting hole, the click returns to the original raised state by elastic restoring force to be fitted into the fitting hole. That is, a snap-fit realized by elastic deformation of the terminal is formed.

In the above-described terminal block, there is a problem that pull-out strength of the terminal becomes weak because rigidity of the click against the torque around the lateral axis generated when the pull-out force is applied to the terminal is low.

One or more aspects of the present disclosure are advantageous to provide one or more terminal blocks, bobbins and coil devices with high pull-out strength of one or more terminals fixed by snap-fit using a click raised by bending.

According to aspects of the present disclosure, there is provided a terminal block including a terminal and a base having a terminal attachment part to which the terminal is attached. The terminal includes a coupling part coupled to the terminal attachment part. The terminal attachment part is formed with an insertion hole extending in a first direction and into which the coupling part is inserted, and a fitting hole communicating with the insertion hole. The coupling part includes a click part configured to fit into the fitting hole, and the click part projects toward the fitting hole by being bent at a root of the click part along a straight line substantially parallel to the first direction.

According to aspects of the present disclosure, there is further provided a bobbin including a bobbin part around which a coil is to be wound and the terminal block described above. The bobbin part and the base of the terminal block are integrally formed. The terminal includes a coil connecting part to which a conductive wire of a coil is to be connected, and a terminal part to be connected to a circuit.

According to aspects of the present disclosure, there is further provided a coil device including the bobbin described above and a coil wound around the bobbin part.

BRIEF DESCRIPTION OF THE ACCOMPANYING DRAWINGS

DETAILED DESCRIPTION

Figure 1:
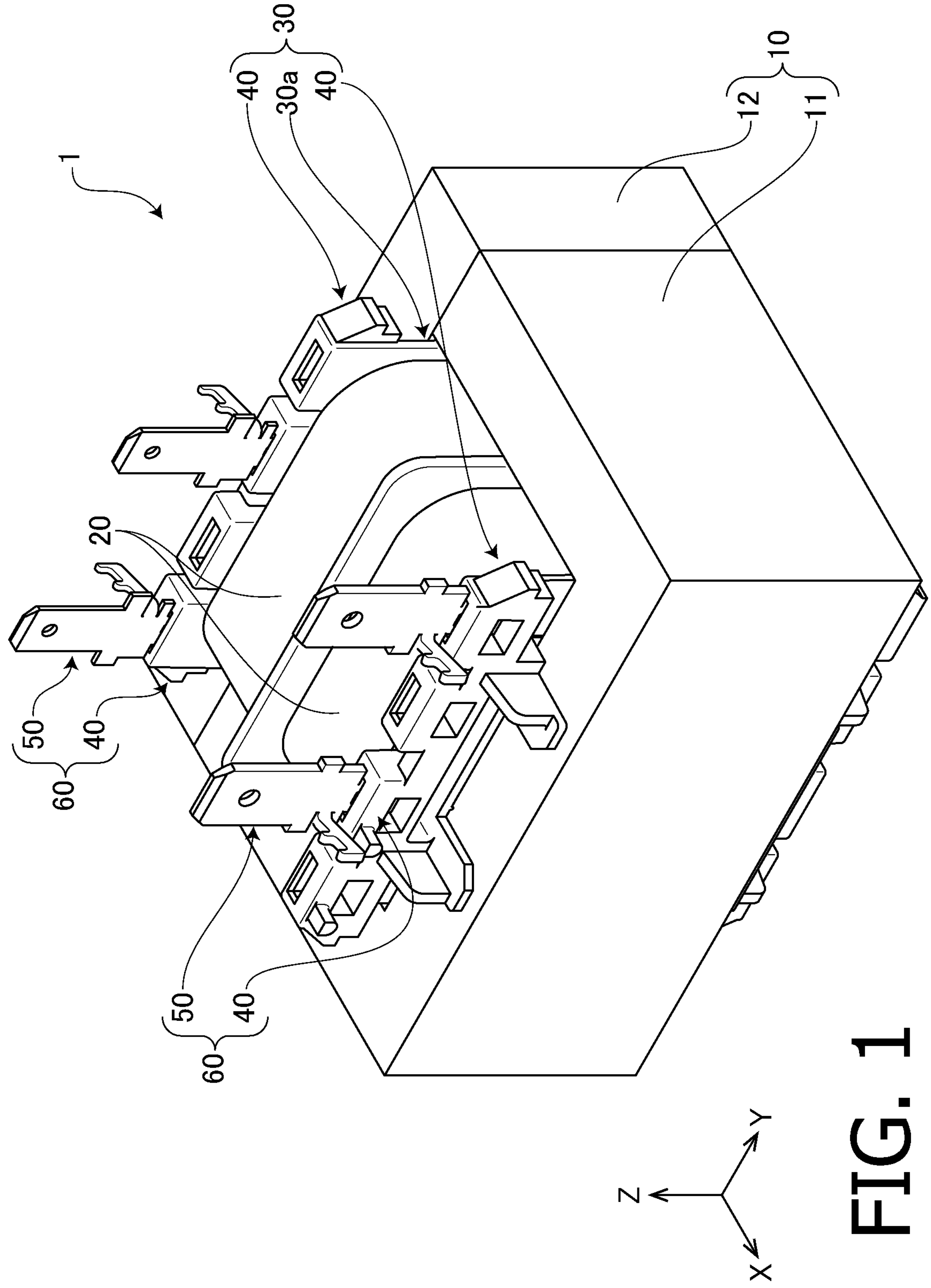
FIG. 1 is an external view of a reactor according to an embodiment of the present disclosure.

Hereinafter, embodiments of the present disclosure will be described with reference to the drawings. In the following description, the same or corresponding items are denoted by the same or corresponding reference numerals, and redundant description thereof will be omitted. In each drawing, in a case where a plurality of items whose reference numerals are the same are displayed, the reference numerals are appropriately omitted for some of the plurality of items.

FIG. 1 is an external view of a reactor 1 according to an embodiment of the present disclosure.

In the following description, a direction from the upper right to the lower left in FIG. 1 is defined as an X-axis direction, a direction from the upper left to the lower right is defined as a Y-axis direction, and a direction from the lower side to the upper side is defined as a Z-axis direction. The X-axis direction, the Y-axis direction, and the Z-axis direction are orthogonal to each other. For convenience of explanation, the X-axis positive direction is also referred to as front, the X-axis negative direction is also referred to as rear, the Y-axis positive direction is also referred to as left, the Y-axis negative direction is also referred to as right, the Z-axis positive direction is also referred to as up, and the Z-axis negative direction is also referred to as down. These directional designations are used to simply describe relative positions and orientations of components of the reactor 1, and thus do not indicate orientation of the reactor 1 in use. The reactor 1 may be used with any one of the X-axis direction, the Y-axis direction, the Z-axis direction, and an intermediate direction thereof oriented vertically.

The reactor 1 includes an EI-shaped core 10 having a center leg (not shown), a bobbin with terminal block 30 (hereinafter simply referred to as a "bobbin 30") provided with a substantially cylindrical bobbin part 30*a* having a hollow part through which the center leg of the core 10 is inserted and a terminal block base 40 (hereinafter simply referred to as a "base 40"), one or more coils 20 (in the illustrated specific example, two coils 20) wound around the bobbin part 30*a,* and a plurality of terminals 50 attached to the base 40. A terminal block 60 is formed by attaching the terminals 50 to the base 40.

The core 10 is a gapped core, and a gap (not shown) is formed by joining an end surface of a center leg of an E-shaped core 11 to a side surface of an I-shaped core 12 via a flat plate-shaped gap member (not shown) formed of a non-magnetic material such as resin. The core 10 is a powder magnetic core, but may be another type of magnetic core (for example, a ferrite magnetic core, a laminated magnetic core in which electromagnetic steel sheets such as silicon steel sheets are laminated, or the like).

The coil 20 is formed by spirally winding a conductive wire coated with an insulating material such as enamel. As the conductive wire, for example, a rectangular wire or a round wire formed of copper, aluminum, or the like is used. The coil 20 of the present embodiment is formed by winding a round wire on a multilayer regular winding, but the cross-sectional shape and winding method of the conductive wire are not limited to this configuration.

Figure 2:
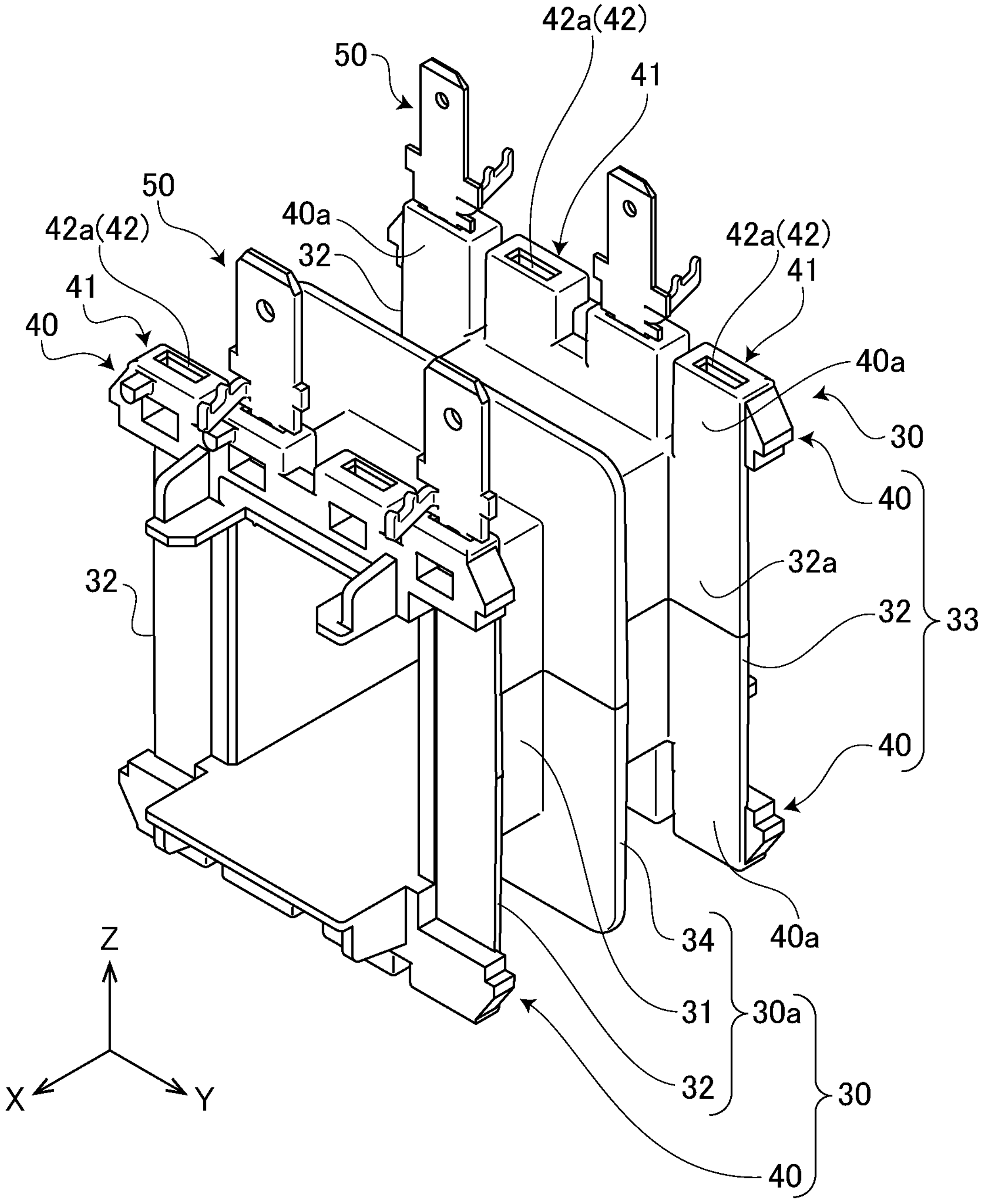
FIG. 2 is an external view of a bobbin according to an embodiment of the present disclosure.

FIG. 2 is an external view of the bobbin 30 according to the embodiment of the present disclosure to which the terminals 50 are attached. The bobbin 30 is formed of an electrically insulating material such as phenol resin, epoxy resin, unsaturated polyester resin, urethane resin, BMC (Bulk Molding Compound), PPS (Polyphenylene Sulfide), or PBT (Polybutylene Terephthalate).

The bobbin 30 includes the bobbin part 30*a* having a cylindrical body 31 and two pairs of bases 40 integrally formed at both end portions of the body 31 in its extending direction (the X-axis direction). The bobbin part 30*a* has two pairs of flange parts 32 and one flange part 34 integrally formed on an outer periphery of the body 31. The flange parts 32 and the flange part 34 are flat plate-shaped components perpendicular to the extending direction of the body 31. The flange part 32 is a vertically long rectangular component formed on each of left and right side surfaces of both end portions in the extending direction of the body 31. The flange part 34 is an annular component formed over the entire circumference of the body 31 at a central portion in the extending direction of the body 31.

One annular flange part 33 is formed by one pair of vertically long flange parts 32 and one pair of laterally long bases 40 provided at each end portion in the extending direction of the body 31. Back surfaces 32*a* of one pair of flange parts 32 and back surfaces 40*a* of one pair of bases 40 constituting each flange part 33 are formed on a same plane.

The outer periphery of the body 31 of the bobbin part 30*a* around which the coil 20 (FIG. 1) is wound is partitioned in an axial direction of the coil 20 (i.e., the X-axis direction) by the pair of flange parts 33 and 34. Two coils 20 are wound around the body 31 of the bobbin part 30*a.* One of the coils 20 is disposed between one of the flange parts 33 and the flange part 34 of the bobbin part 30*a* (hereinafter referred to as a "first winding part"), and the other of the coils 20 is disposed between the other of the flange parts 33 and the flange part 34 (hereinafter referred to as a "second winding part").

A plurality of terminal attachment parts 41 (in the illustrated specific example, four terminal attachment parts 41) to which the terminals 50 are to be attached are formed to the base 40 at predetermined intervals in the Y-axis direction. An insertion hole 42 extending in an up-down direction into which a lower portion of the terminal 50 (a coupling part 53 which will be described later) is to be inserted is formed to each of the terminal attachment parts 41. The upper end of the insertion hole 42 opens at an upper surface of the terminal attachment part 41 to form an insertion port 42*a*. In the present embodiment, the terminals 50 are attached to two of the four terminal attachment parts 41. Details of an internal structure of the terminal attachment part 41 will be described later.

Figure 3:
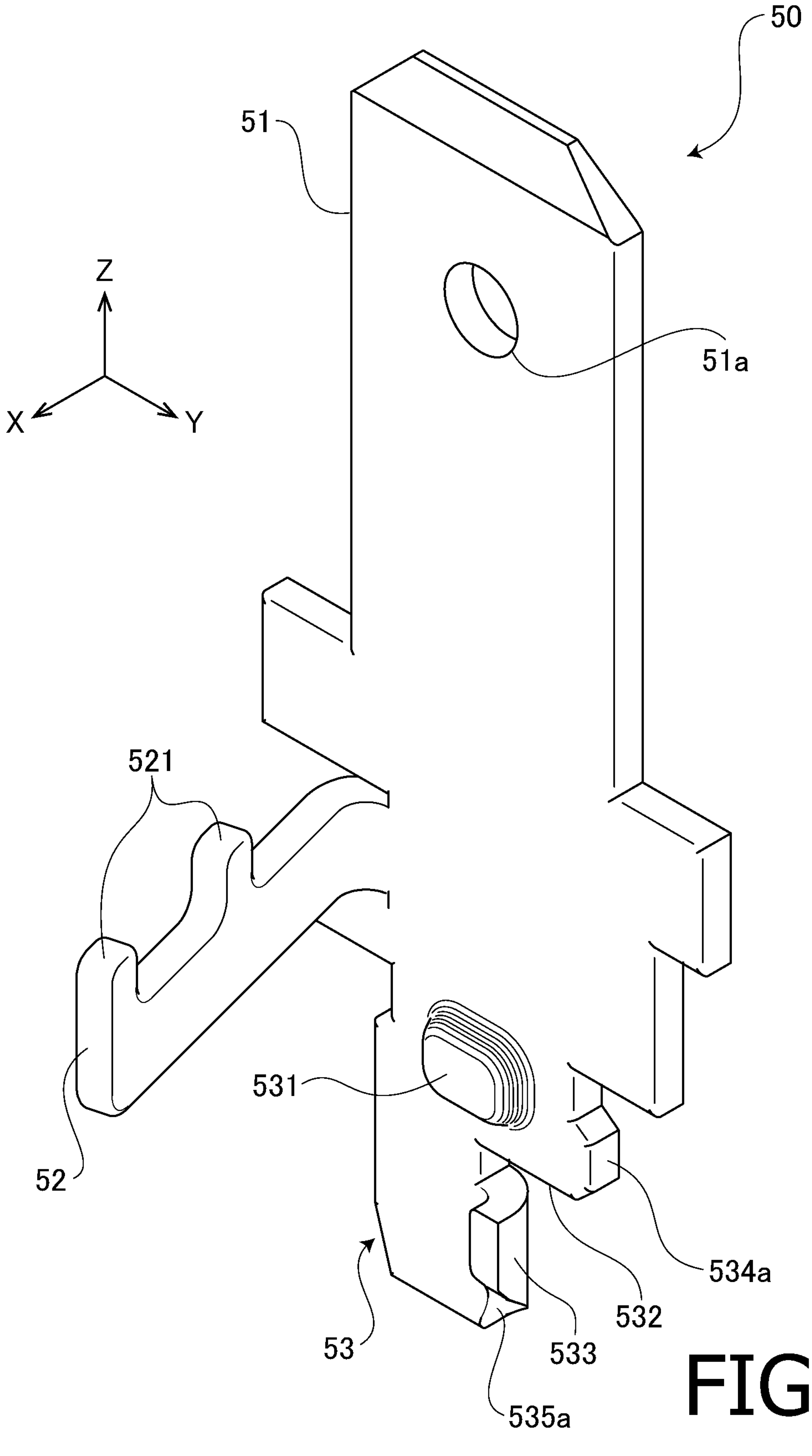
FIG. 3 is an external view of a terminal according to an embodiment of the present disclosure.
Figure 4:
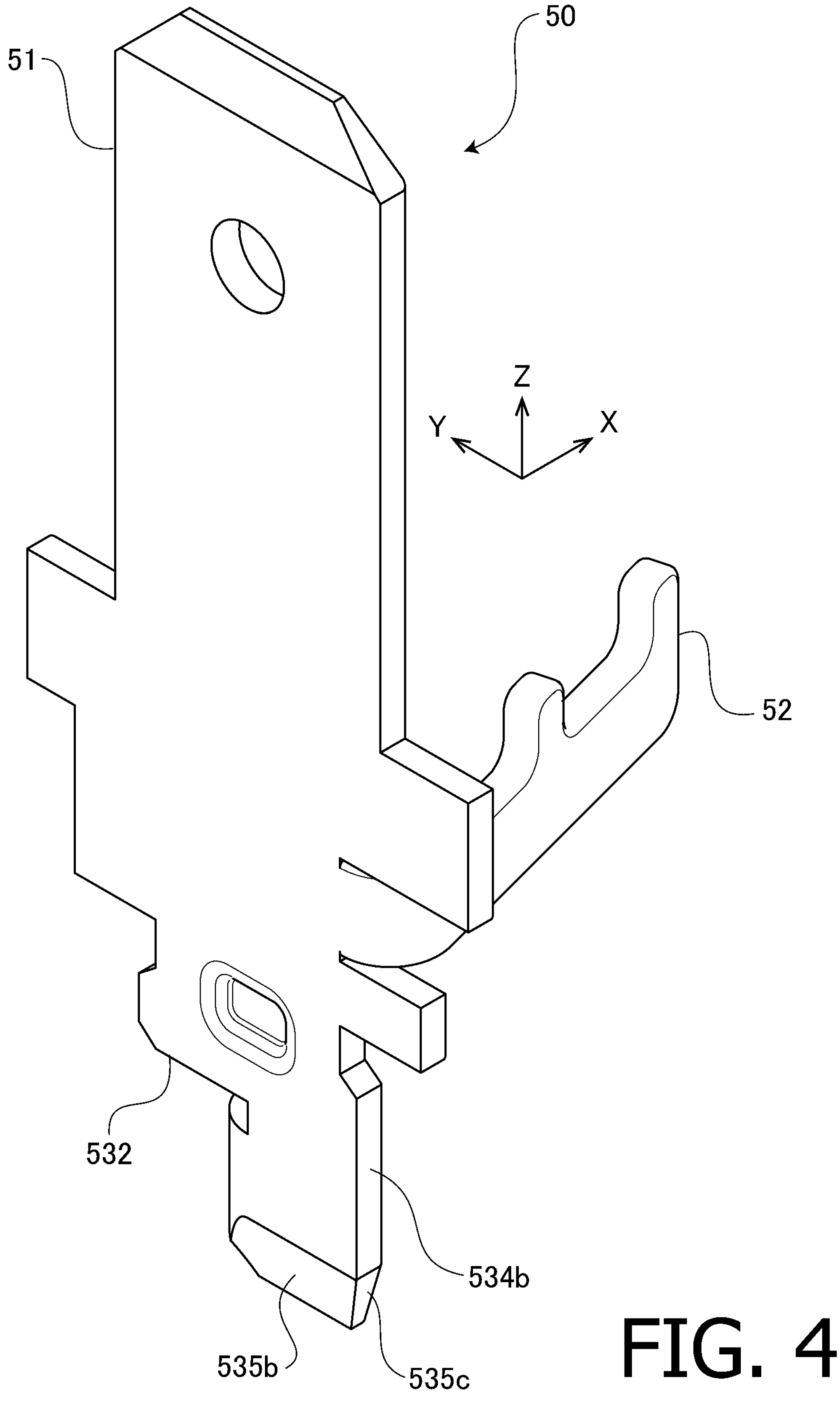
FIG. 4 is an external view of a terminal according to an embodiment of the present disclosure.

FIGS. 3 and 4 are external views of the terminal 50 viewed from different directions. For example, the terminal 50 is formed of a metal plate such as a copper plate, brass plate, phosphor bronze plate, iron plate, or stainless-steel plate, and is subjected to surface treatment such as nickel plating, tin plating, or trivalent chromate treatment as necessary. The terminal 50 of the present embodiment can be manufactured at a relatively low cost by press working. It is noted that the method of manufacturing the terminal 50 is not limited to press working, and other working methods such as cutting, forging, and casting, or a combination thereof can be used.

The terminal 50 includes a terminal part 51 for connecting the reactor 1 to a circuit, a coil connecting part 52 for connecting an end portion of a conducting wire of the coil 20, and a coupling part 53 to be inserted into the insertion hole 42 formed to the terminal attachment part 41 of the base 40. The terminal 50 is formed of a flat plate perpendicular to the X-axis direction except for the coil connecting part 52, and a protruding part 531 and a click part 533 of the coupling part 53 which will be described later.

The terminal part 51 is a rectangular flat plate-shaped portion that is vertically long. The terminal part 51 is formed in a shape that can be inserted into a plug adapter. through hole 51*a* used for fitting with the plug adapter is formed to the terminal part 51. A crimp terminal or the like can be fixed to the terminal part 51 with a screw by making use of the through hole 51*a*.

The coil connecting part 52 is an arm extending perpendicularly to the terminal part 51. Projections 521 projecting upward are formed at a distal end portion and an intermediate portion of the coil connecting part 52 in its extending direction in order to facilitate entanglement of the conductive wire of the coil 20.

A projecting part 531 projecting in the same direction as a click part 533, which will be described later, is formed at the center in the left-right direction of an upper portion of the coupling part 53. The projecting part 531 is formed by, for example, a half punch.

A notch 532 is formed from an end in the left-right direction to the center at vertical center of the coupling part 53. A portion of the coupling part 53 below the notch 532 is bent forward to form a click part 533 raised to project forward (i.e., toward a fitting hole 43 (FIG. 6) which will be described later).

As a result, the click part 533 is disposed at a substantially central portion in the Y-axis direction of the terminal 50 and fits into a substantially central portion in the Y-axis direction of the fitting hole 43. In other words, the click part 533 engages with a substantially central portion in the Y-axis direction of a lower surface of a corner part 44 which will be described later. The corner part 44 has the lowest rigidity at the central portion in the Y-axis direction and thus the central portion in the Y-axis direction of the corner part 44 easily displaces by elastic deformation. Therefore, by configuring the click part 533 to engage with the central portion in the Y-axis direction of the corner part 44, the corner part 44 can be made to deform by an amount necessary for fitting with a weak force as compared to a case where the click part 533 is configured to engage with a portion of the corner part

44 away from the central portion in the Y-axis direction. In addition, strain applied to the resin forming the terminal attachment part 41 at the time of fitting decreases, and thus reliability of the terminal attachment part 41 improves.

In the present embodiment, the click part 533 is bent at the root thereof at right angle, but the present disclosure is not limited to this configuration. An angle at which the click part 533 is bent may be any value as long as sufficient forward projection amount of the click part 533 (i.e., a later-described "engagement length L" which is a length in the X-axis direction of a portion of the click part 533 that engages with the terminal attachment part 41) can be ensured.

A first positioning surface 534*a* (FIG. 3) and a second positioning surface 534*b* (FIG. 4) perpendicular to the Y-axis direction are formed at a predetermined interval on left and right ends of the coupling part 53. The Y-axis direction is a direction (third direction) orthogonal to the Z-axis direction (first direction) which is the extending direction of the insertion hole 42 and the X-axis direction (second direction) in which the projecting part 531 projects. The first positioning surface 534*a* and the second positioning surface 534*b* constitute a Y-axis direction positioning structure (second positioning structure) that positions the coupling part 53 with respect to the insertion hole 42 in the Y-axis direction.

Tapered surfaces 535*a* (FIG. 3), 535*b* and 535*c* (FIG. 4) are formed at a lower end portion of the coupling part 53. This facilitates insertion of the coupling part 53 of the terminal 50 into the insertion hole 42 of the terminal attachment part 41.

Figure 5:
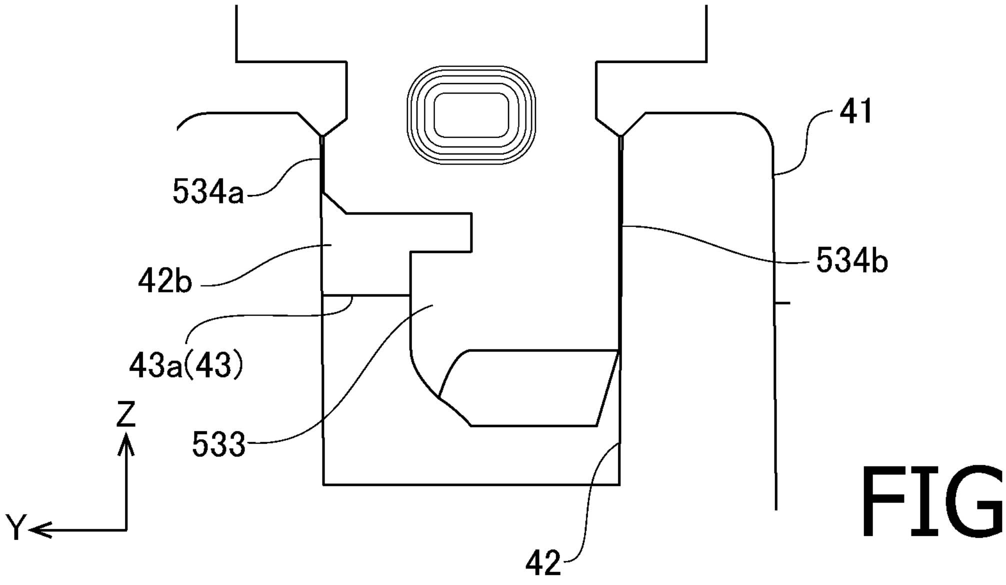
FIG. 5 is a diagram showing a fitted state of a terminal and a terminal insertion part of a bobbin.
Figure 6:
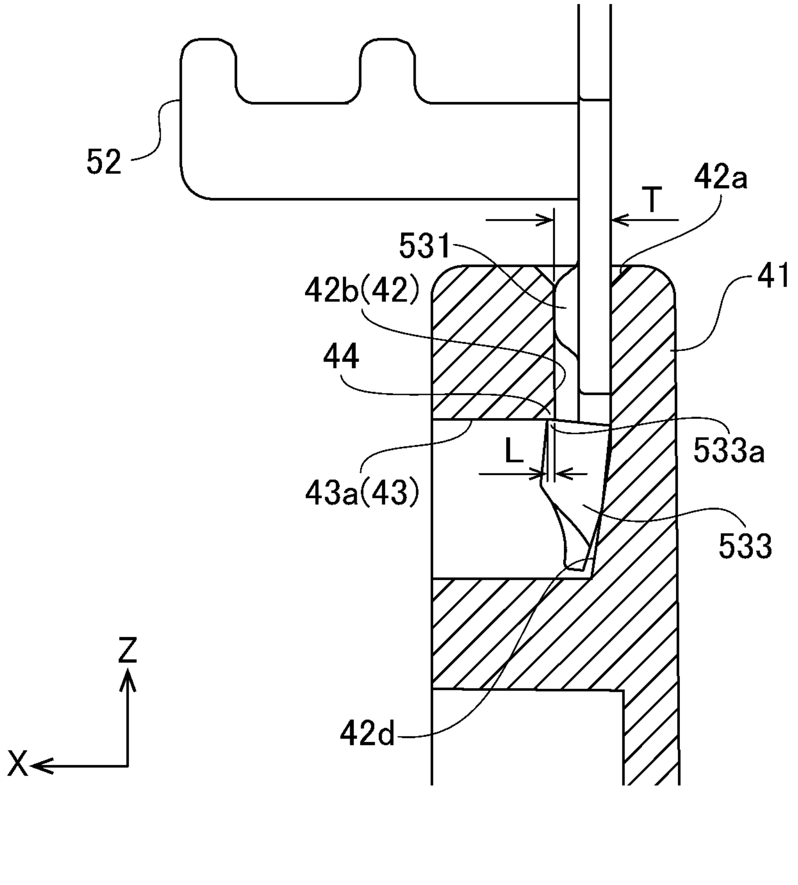
FIG. 6 is a diagram showing a fitted state of a terminal and a terminal insertion part of a bobbin.

FIGS. 5 and 6 are diagrams showing states in which the terminal 50 is inserted into the insertion hole 42 of the terminal attachment part 41 of the base 40. FIG. 5 shows a state in which the terminal 50 is in the middle of insertion into the insertion hole 42 (i.e., before the coupling part 53 of the terminal 50 reaches a coupled position which is the lowest position), and FIG. 6 shows a state in which the coupling part 53 of the terminal 50 reached the coupling position and is fixed to the terminal attachment part 41.

The terminal attachment part 41 is formed with the vertically extending insertion hole 42 into which the coupling part 53 of the terminal 50 is to be inserted, and the fitting hole 43 extending forward from a lower portion of the insertion hole 42. The insertion hole 42 and the fitting hole 43 communicate with each other to form a hollow portion extending in an L shape. The fitting hole 43 opens at a front wall surface 42*b* of the insertion hole 42 (i.e., a wall surface perpendicular to the X-axis direction). The cross-sectional shapes of the insertion hole 42 and the fitting hole 43 of the present embodiment are rectangular, but may be other cross-sectional shapes. In the present embodiment, the front of the fitting hole 43 is open to the outside, but the front of the fitting hole 43 may be closed.

The protruding part 531 formed to the coupling part 53 of the terminal 50 is an X-axis direction positioning structure (first positioning structure) that positions the coupling part 53 with respect to the insertion hole 42 in the X-axis direction (second direction) orthogonal to the Z-axis direction (first direction) that is the extending direction of the insertion hole 42.

The terminal 50 is inserted, from the click part 533 at a tip portion, into the insertion hole 42 through the insertion port 42*a*. A width (a size in the Y-axis direction) and a thickness (a size in the X-axis direction) of the coupling part 53 are the same as or smaller than sizes of the insertion hole 42 in the Y-axis direction and the X-axis direction except for a portion where the projecting part 531 is formed (more precisely, the projecting part 531 and a peripheral portion thereof). Therefore, the terminal 50 can be inserted into the insertion hole 42 without a large resistance until the projecting part 531 reaches the insertion port 42*a*.

A thickness T (FIG. 6) of the coupling part 53 at a portion where the projecting part 531 is formed is slightly larger than a size of the insertion hole 42 in the X-axis direction by a predetermined amount. Therefore, the portion at which the projecting part 531 is formed is inserted into the insertion hole 42 by press-fitting. Thus, inclination of the terminal 50 in the X-axis direction (i.e., swinging of the terminal 50 about the Y-axis) and rattling of the terminal 50 are suppressed, and pull-out strength of the terminal 50 is enhanced. In addition, by the suppression of the movement of the terminal 50 in the X-axis direction, the engagement between the click part 533 of the terminal 50 and the fitting hole 43 of the terminal attachment part 41 becomes less likely to disengage, and the fixing of the terminal 50 is stabilized. It is noted that the thickness T of the coupling part 53 at the portion where the projecting part 531 is formed may be substantially the same as the size of the insertion hole 42 in the X-axis direction so that the projecting part 531 can be inserted into the insertion hole 42 without pressing. In this case, although the pull-out strength of the terminal 50 is not enhanced, the inclination in the X-axis direction and the rattling of the terminal 50 are prevented. Further, force for inserting the terminal 50 into the insertion hole 42 is reduced.

In a case where a height of the projecting part 531 (an amount of projection in the X-axis direction) is increased to such an extent that press-fitting is necessary, the terminal attachment part 41 deforms around the projecting part 531. As the portion of the terminal attachment part 41 engaging with the click part 533 deforms, the engagement disengages and the terminal 50 becomes easy to be pulled out. Therefore, it is desirable that the projecting part 531 deforms at a position away from the click part 533. In the present embodiment, the click part 533 is provided at the lower end portion of the coupling part 53 and the projecting part 531 is provided at the upper end portion of the coupling part 53, to reduce the influence of the press-fitting of the projecting part 531.

A lower portion of a rear wall surface of the insertion hole 42 (specifically, a portion lower than a ceiling surface 43*a* of the fitting hole 43) is formed with an inclined surface 42*d* of which a lower end lies anterior to an upper end*. Upon reaching the inclined surface 42*d*, the click part 533 is gradually pushed forward by the inclined surface 42*d* as the click part 533 is pushed downward. Then, a lower portion of the front wall surface 42*b* of the insertion hole 42 (specifically, the corner part 44 where the front wall surface 42*b* of the insertion hole 42 and the ceiling surface 43*a* of the fitting hole 43 intersect with each other) is pushed by the click part 533 (specifically, a tip upper part 533*a* of the click part 533) to displace forward by elastic deformation.

The inclined surface 42*d* is a flat surface in the present embodiment, but may be a curved surface. In this case, the inclined surface 42*d* may be, for example, a cylindrical surface having a constant curvature or a curved surface having a curvature that gradually increases toward the bottom. Further, the inclined surface 42*d* may be a surface formed by continuously connecting a curved surface and a flat surface (i.e., by connecting a curved surface and a flat surface so that the inclination continuously changes).

As the tip upper part 533*a* of the click part 533 passes the corner part 44, the force the corner part 44 had been receiving from the click part 533 is eliminated, and the corner part 44 returns to the original shape (i.e., displaces rearward) due to elastic restoring force. At this time, the click part 533 is pushed forward toward the fitting hole 43 by the inclined surface 42*d* by a distance L (FIG. 6), and the tip upper part 533*a* is accommodated in the fitting hole 43. Therefore, even if a force to pull out the terminal 50 (force in the Z-axis positive direction) is applied, the tip upper part 533*a* of the click part 533 abuts against the ceiling surface 43*a* of the fitting hole 43 (specifically, a lower surface of the corner part 44), and thus the tip upper part 533*a* of the click part 533 cannot move out of the fitting hole 43 and the terminal 50 is prevented from being pulled out from the terminal attachment part 41.

The pull-out strength varies depending on a length L in the X-axis direction of a portion of the tip upper part 533*a* of the click part 533 and a portion of the corner part 44 engaging with each other (hereinafter, referred to as an "engagement length L"). The engagement length L varies depending on design of the inclined surface 42*d* (e.g., an inclination angle and a length of the inclined surface 42*d*). That is, the pull-out strength can be adjusted by the design of the inclined surface 42*d.*

As shown in FIG. 6, an edge of the tip upper part 533*a* of the click part 533 and an edge of the corner part 44 of the terminal attachment part 41 are not chamfered, and an outer shape of each of these edges is formed by two intersecting surfaces (specifically, a surface substantially perpendicular to the X-axis direction and a surface substantially perpendicular to the Z-axis direction). By forming the edges of the portions to be engaged with each other into angular shapes in the manner described above, the effective engagement length L can be increased, and a larger pull-out strength can be obtained.

In the present embodiment, the click part 533 is formed by bending the base material of the terminal 50 along the Z-axis (more precisely, along a straight line extending in the Z-axis direction). Therefore, the click part 533 has not so high rigidity against the torque around the bending axis (Z-axis), but has high rigidity against the torque around the Y-axis perpendicular to the bending axis. It is noted that the Z-axis direction is an extending direction of the insertion hole 42, that is, a direction for inserting the terminal 50 into the insertion hole 42. Therefore, when pulling out the terminal 50, torque around the Y-axis perpendicular to the pull-out direction acts on the click part 533. Accordingly, when pulling out the terminal 50, the click part 533 is less likely to deform by the pull-out force.

In the present embodiment, the click part 533 is bent at the root thereof along a straight line exactly parallel to the Z-axis direction, but the bending axis only needs to be substantially parallel to the Z-axis direction. Further, for example, when the angle formed by the bending axis and the Z-axis direction is 45 degrees or less, the click part 533 is still less likely to deform by the pull-out force.

In the illustrated specific example of the present embodiment, the bobbin 30 is provided with 4 bases 40, and each base 40 is provided with 4 terminal attachment parts 41, but the present disclosure is not limited to this configuration. The bobbin 30 may be provided with a single or a plurality of (for example, 2 to 16) bases 40. The base 40 may be provided with a single or a plurality of (for example, 2 to 16) terminal attachment parts 41.

In the illustrated specific example of the present embodiment, the terminals 50 are attached only to the upper four terminal attachment parts 41 among the total of 16 terminal attachment parts 41 provided on the bobbin 30, but the present disclosure is not limited to this configuration. The number of terminals 50 to be attached to the bobbin 30 may be changed depending on the number of coils 20 mounted to the bobbin 30 or the like. In the present embodiment, more terminal attachment parts 41 than the terminals 50 are provided at various positions and in various orientations. With this configuration, it is possible to select and use the terminal attachment parts 41 at positions and in orientations suitable for connection to a circuit of the reactor 1, and thus it is possible to increase the degree of freedom of installation of the reactor 1.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein.

For example, appropriate combinations of at least some of the technical configurations of the embodiment described in the specification and known technical configurations are also included in the scope of the present disclosure. For instance, according to aspects of the present disclosure, the following modifications are possible.

In the above-described embodiment, the click part 533, which is a projecting portion that fits into the fitting hole 43, is formed by cutting and raising the base material. However, the shape and the processing method of the projecting part that fits into the fitting hole 43 are not limited to this configuration. For example, in place of the click part 533, a projecting portion formed by half-punching may be fitted into the fitting hole 43.

In the above-described embodiment, a gap is provided to the core 10 by interposing a gap member between the center leg of the E-shaped core 11 and the I-shaped core 12. However, the present disclosure is not limited to this configuration. A gapless core may also be used. In addition, the structure of the gapped core is not limited to the structure in which the gap member is interposed in the bonding portion of the core. For example, a structure in which a thick adhesive layer is provided in the bonding portion of the core without using the gap member or a structure in which an air gap is provided may be used.

The core 10 of the above-described embodiment is an EI-shaped core in which the E-shaped core 11 and the I-shaped core 12 are combined, but the present disclosure is not limited to this configuration. The present disclosure can be applied to a coil device including a core of various forms such as an EE-shaped core in which a pair of E-shaped cores are combined, and an O-shaped core in which a pair of L-shaped cores, J-shaped cores, C-shaped cores, or U-shaped cores are combined.

In the present embodiment, the base 40 of the terminal block 60 is formed integrally on the bobbin 30, but the base 40 may be attached to the bobbin 30 by, for example, screwing or adhesion. The base 40 and the bobbin 30 may also be separated from each other.

The above-described embodiment is an example in which the present disclosure is applied to a reactor, but the present disclosure can also be applied to other types of coil devices such as a transformer. The present disclosure can also be applied to a bobbin for an air-core coil. The present disclosure can also be applied to electric devices other than coil devices, or a terminal block suitable for electric devices other than coil devices.

What is claimed is:

1. A terminal block comprising:
a terminal; and
a base having a terminal attachment part to which the terminal is attached,
wherein the terminal includes a coupling part coupled to the terminal attachment part, and
wherein the terminal attachment part is formed with:
an insertion hole into which the coupling part is inserted, the insertion hole extending in a first direction that is an inserting direction of the coupling part; and
a fitting hole communicating with the insertion hole,
wherein the coupling part includes a click part configured to fit into the fitting hole, and
wherein the click part projects toward the fitting hole by being bent at a root of the click part along a straight line substantially parallel to the first direction.

2. The terminal block according to claim 1,
wherein an inclined surface that pushes the coupling part toward the fitting hole is formed to the terminal attachment part.

3. The terminal block according to claim 2,
wherein the click part is provided at a distal end portion of the coupling part in the first direction, and
wherein the inclined surface is configured to push the distal end portion of the coupling part toward the fitting hole.

4. The terminal block according to claim 1,
wherein the coupling part includes a first positioning structure configured to position the coupling part with respect to the insertion hole in a second direction orthogonal to the first direction.

5. The terminal block according to claim 4,
wherein the first positioning structure is a projecting part that projects in the second direction and contacts a wall surface of the insertion hole.

6. The terminal block according to claim 5,
wherein the projecting part is formed such that the coupling part is slightly larger than the insertion hole in the second direction.

7. The terminal block according to claim 5,
wherein the projecting part is formed at a position away from the click part in the first direction.

8. The terminal block according to claim 4,
wherein the coupling part includes a second positioning structure that positions the coupling part with respect to the insertion hole in a third direction orthogonal to the first direction and the second direction.

9. The terminal block according to claim 8,
wherein the second positioning structure includes:
a first positioning surface formed at one end of the coupling part in the third direction and being in contact with a wall surface of the insertion hole; and
a second positioning surface formed at the other end of the coupling part in the third direction and being in contact with the wall surface of the insertion hole.

10. The terminal block according to claim 1,
wherein a cross-sectional shape of the insertion hole is a rectangle having one side extending in a second direction orthogonal to the first direction, and
wherein the fitting hole opens at a wall surface of the insertion hole perpendicular to the second direction.

11. The terminal block according to claim 4,
wherein the click part is disposed at a central portion of the coupling part in a third direction orthogonal to the first direction and the second direction.

12. The terminal block according to claim 1,
wherein a surface of the click part and a surface of the fitting hole that engage with each other are formed substantially perpendicular to the first direction.

13. A bobbin comprising:
a bobbin part around which a coil is to be wound; and
the terminal block according to claim 1,
wherein the bobbin part and the base of the terminal block are integrally formed, and
wherein the terminal includes:
a coil connecting part to which a conductive wire of a coil is to be connected; and
a terminal part to be connected to a circuit.

14. A coil device comprising:
the bobbin according to claim 13; and
a coil wound around the bobbin part.

* * * * *